(12) United States Patent
Willamowski et al.

(10) Patent No.: US 7,567,707 B2
(45) Date of Patent: Jul. 28, 2009

(54) RED EYE DETECTION AND CORRECTION

(75) Inventors: Jutta K. Willamowski, Grenoble (FR); Gabriela Csurka, Crolles (FR)

(73) Assignee: Xerox Corporation, Norwalk, CT (US)

( * ) Notice: Subject to any disclaimer, the term of this patent is extended or adjusted under 35 U.S.C. 154(b) by 762 days.

(21) Appl. No.: 11/311,991

(22) Filed: Dec. 20, 2005

(65) Prior Publication Data

US 2007/0140556 A1    Jun. 21, 2007

(51) Int. Cl.
  G06K 9/00    (2006.01)
  G06K 9/34    (2006.01)
  G06K 9/62    (2006.01)
  G03F 3/08    (2006.01)

(52) U.S. Cl. ................ 382/167; 382/159; 382/164; 382/165; 382/224; 358/518

(58) Field of Classification Search ......... 382/163–165, 382/167, 159, 160, 224; 358/518–523
See application file for complete search history.

(56) References Cited

U.S. PATENT DOCUMENTS

| | | | |
|---|---|---|---|
| 5,130,789 A | 7/1992 | Dobbs et al. | |
| 5,153,632 A | 10/1992 | Maida et al. | |
| 5,202,719 A | 4/1993 | Taniguchi et al. | |
| 5,404,192 A | 4/1995 | Konishi et al. | |
| 5,432,863 A | 7/1995 | Benati et al. | |
| 5,990,973 A | 11/1999 | Sakamoto | |
| 6,009,209 A | 12/1999 | Acker et al. | |
| 6,016,354 A | 1/2000 | Lin et al. | |
| 6,252,976 B1 * | 6/2001 | Schildkraut et al. | ......... 382/117 |
| 6,278,491 B1 | 8/2001 | Wang et al. | |
| 6,577,751 B2 | 6/2003 | Yamamoto | |
| 6,718,051 B1 | 4/2004 | Eschbach | |
| 6,728,401 B1 | 4/2004 | Hardeberg | |
| 6,895,112 B2 | 5/2005 | Chen et al. | |
| 7,343,028 B2 * | 3/2008 | Ioffe et al. | ......... 382/118 |

(Continued)

OTHER PUBLICATIONS

C. Burges, "A Tutorial on Support Vector Machines for Pattern Recognition", Data Mining and Knowledge Discovery, vol. 2, No. 2, p. 121-167 (Kluwer Academic Publishers, 1998).

(Continued)

*Primary Examiner*—Yubin Hung
(74) *Attorney, Agent, or Firm*—Fay Sharpe LLP

(57) ABSTRACT

A system suited to correction of red eyes in images includes a detection module which, for a plurality of pixels in a digital image, assigns a probability that a pixel is within a red eye. The probability has a value which may vary from a minimum value to maximum value. A classifier module classifies a patch of the image comprising a region of contiguous pixels which have at least a threshold probability that the pixel is within a red eye. The classifier module distinguishing patches which have a likelihood of including a red eye from other patches which have a likelihood of containing a face or background error rather than a redeye. A correction module assigns a correction to apply to pixels which are in a region of contiguous pixels having at least the threshold probability that the pixel is within a red eye and for which the associated patch has been identified by the classifier as having a probability of including a red eye.

30 Claims, 6 Drawing Sheets

U.S. PATENT DOCUMENTS

| | | | |
|---|---|---|---|
| 2002/0126893 A1* | 9/2002 | Held et al. | 382/167 |
| 2002/0176623 A1 | 11/2002 | Steinberg | |
| 2003/0044178 A1 | 3/2003 | Oberhardt et al. | |
| 2003/0142285 A1 | 7/2003 | Enomoto | |
| 2003/0202105 A1 | 10/2003 | Gaubatz et al. | |
| 2004/0213476 A1* | 10/2004 | Luo et al. | 382/254 |
| 2004/0228542 A1 | 11/2004 | Zhang et al. | |
| 2005/0117173 A1* | 6/2005 | Kugo | 358/1.1 |
| 2005/0232481 A1* | 10/2005 | Wu | 382/167 |

OTHER PUBLICATIONS

R. A. Calvo, M. Partridge, M. A. Jabri, "A Comparative Study of Principal Component Analysis Techniques", Australian Conference in Neural Networks, Brisbane (1998).

F. De la Torre and M. J. Black, "Robust Principal Component Analysis for Computer Vision", International Conference on Computer Vision (2001).

W. Duch, R. Adamczak, G.H.F. Diercksen, "Distance-based Multilayer Perceptrons", CIMCA pp. 75-80 (ed. M. Mohammadian, IOS Press, Amsterdam) (1999).

W. Duch, K. Grudzinski, G. Diercksen, "Minimal distance neural methods", Proc. I.J. CNN, pp. 1299-1304 (1998).

Gaubatz, M., Ulichney, "Automatic red-eye detection and correction", IEEE ICIP 2002, pp. I-804-I-807.

J. Hardeberg, "Red Eye Removal Using Digital Color Image Processing", PICS 2001, pp. 283-287 (2001).

Sergey Ioffe, "Red Eye Detection With Machine Learning", ICIP 2003.

K. Mikolajczyk and C. Schmid, "A Performance Evaluation of Local Descriptors", IEEE Conference on Pattern Analysis and Machine Intelligence, vol. 27, No. 10 Oct. 2005.

S. Omachi and H. Aso, "A Fast Algorithm for a $k$-NN Classifier Based on Branch and Bound Method and Computational Quantity Estimation", *In Systems and Computers in Japan*, vol. 31, No. 6, pp. 1-9, 2000.

U.S. Appl. No. 11/145,710, filed Jun. 3, 2005, Lixin Fan et al.

A. M. Pires, "Robust Linear Discriminant Analysis and the Projection Pursuit Approach—Practical Aspects Developments in Robust Statistics", International Conference on Robust Statistics, Heidelberg 2001, pp. 317-329 (Springer-Verlag 2003).

R. Povinelli, M. Johnson, A. Lindren, J. Ye, "Time Series Classification Using Gaussian Mixture Models of Reconstructed Phase Spaces", IEEE Transaction on Knowledge and Data Engineering, vol. 16, No. 6, Jun. 2004, pp. 779-783.

R. Schettini et al, "A Modular Procedure for Automatic Redeye Correction in Digital Photos", ICIP 2003.

S. Singh, J.F. haddon, M. Markou, "Nearest Neighbour Strategies for Image Understanding", Proc. Workshop on Advanced Concepts for Intelligent Visions, Systems (ACIVZ '99), Baden-Baden, (Aug. 2-7, 1999).

John R. Smith and Shih-Fu Chang, "VisualSEEK: a fully automated content-based image query system", ACM Multimedia, 1996.

B. Smolka et al, "Towards Automatic Redeye Effect Removal", Pattern Recognition Letters, 24 (2003) 1767-1785.

L. Zhang, Y. Sun, M. Li, H. Zhang, "Automated Red-Eye Detection and Correction in Digital Photographs", ICIP 2004.

"Remove "Red-Eye" Effect From Your Images," www.vicman.net/redeye (Feb. 4, 2005).

"Red-Eye Correction: Using Point to Point", www.jasc.com/support/learn/tutorials/archive/paintshoppro/red-eye2.asp?pg=1 (Feb. 4, 2005).

S. Omachi and H. Aso, "A Fast Algorithm for a $k$-NN Classifier Based on Branch and Bound Method and Computational Quantity Estimation".

R. Povinelli, M. Johnson, A. Lindren, J. Ye, "Time Series Classification Using Gaussian Mixture Models of Reconstructed Phase Spaces", IEEE Transaction on Knowledge and Daqta E#ngineering, vol. 16, No. 6, Jun. 2004, ppo. 779-783.

B. Smolka et al., "Towards Automatic Redeye Effect Removal", Pattern Recognition Letters, 24 (2003) 1767-1785.

"Red-Eye Correction: Using Point to Point", www.jasc.com/support/learn/tutorials/archive/paintshoppro/red-eye2.asp?pg=1 (2/4/200).

\* cited by examiner

RED EYE DETECTION AND CORRECTION

BACKGROUND

The present exemplary embodiment relates to image processing. It finds particular application in connection with the automated correction of digital images for red eye.

Red eye is a common problem in photographic images. It occurs whenever a flash is used and the light reflecting from the human retina makes the eyes appear red instead of their natural color. Recognizing this problem, camera manufacturers have attempted to minimize or inhibit red eye by equipping cameras with the ability to emit one or more pre-flashes of light immediately prior to completion of the actual photograph. These pre-flashes are intended to constrict the subject's pupils to minimize light incident on the retina and reflected therefrom. Although cameras equipped with pre-flash hardware can alleviate red eye problems, they are not always well received since the red eye artifact is not always prevented. They also tend to consume much more energy, induce a significant delay between pushing the button and taking the photograph, and result in people blinking the eyes. Red eye has become more prevalent and severe as cameras have been made smaller with integrated flashes. The small size coupled with the built-in nature of the flash requires placement of the flash in close proximity to the objective lens. Thus, a greater portion of the reflected light from a subject's retinas enters the object lens and is recorded.

Techniques have been developed for the detection and correction of red eye in images. In one method, an operator visually scans all images and marks those images including red eye for further processing. The processing typically involves modifying the red pixels in the identified red eye. Efforts to eliminate or reduce operator involvement have resulted in automated processes that attempt to detect red eye based upon color, size, and shape criteria. When a red eye is detected, the automated process applies a correction to the red area. Given that the color red is very common, and that red eye is not present in a great many images (e.g., those not taken using a flash, those not including human subjects, etc.), false-positives are common. Thus, red buttons, a piece of red candy, and the like, may all be misidentified as red eye using such automated red eye detection techniques.

Some red eye correction techniques rely on face detection. However, face detection is in itself a difficult task. It does not perform well for non-frontal, rotated and occluded faces. In such cases these methods tend to perform poorly.

CROSS REFERENCE TO RELATED PATENTS AND APPLICATIONS

U.S. application Ser. No. 11/145,710, filed Jun. 3, 2005, entitled "RED EYE DETECTION AND CORRECTION," by Lixin Fan, et al., the disclosure of which is expressly incorporated herein in its entirety by reference, discloses a method suited to the detection and correction of red eyes. The method includes assigning a probability to pixels of a digital image of the pixel being in a red eye, the probability being a function of a color of the pixel. Generally circular regions in the image of contiguous pixels which satisfy at least one test for a red eye are then identified. The test may include determining a size or shape of the region or an extent of overlap with a region comprising pixels having at least a threshold probability of being in a red eye. For each of a plurality of the pixels, such as simply those in identified regions, or for all pixels or a larger group of the pixels, a color correction for the pixel is determined. The correction is a function of the assigned probability that the pixel is within a red eye and a color of the pixel.

INCORPORATION BY REFERENCE

The following references, the disclosures of which are expressly incorporated herein in their entireties by reference, are mentioned:

Methods for recognizing or addressing red eye are disclosed, for example, in U.S. Pat. Nos. 5,990,973, 6,718,051, and the references cited therein. Other red eye detection methods rely on face detection or learning, as disclosed, for example, in U.S. Pat. Nos. 6,009,209, 6,278,491, and 6,278,401.

U.S. Published Patent Application 2004/0228542, published Nov. 18, 2004, entitled "MODIFICATION OF RED EYE-EFFECT IN DIGITAL IMAGE," by Zhang, et al. discloses a process-for automatic artifact compensation in a digital representation of an image. The process includes detecting, by a processor, regions corresponding to facial images within the digital representation. Red eye regions within the detected regions are located by the processor and the located red eye regions are automatically modified.

U.S. Pat. No. 6,895,112 entitled "RED EYE DETECTION BASED ON RED REGION DETECTION WITH EYE CONFIRMATION," by Chen, et al., discloses a system which initially identifies pixels that correspond to the color of red eye within an image. A determination is then made as to whether these identified pixels and surrounding areas are part of an eye or not part of an eye. Those identified pixels that are determined to be part of an eye are the detected red eye regions. The system includes a filter which identifies groups of pixels, based on a set of rules, which are to be output to an eye confirmation module as detected regions. An eye confirmation module receives the detected regions from the region detection module and identifies, for each of the detected regions, whether the detected region is part of an eye.

Lei Zhang, Yanfeng Sun, Mingjing Li, Hongjiang Zhang, "AUTOMATED RED EYE DETECTION AND CORRECTION IN DIGITAL PHOTOGRAPHS," ICIP 2004, discloses an automatic approach for detecting and correcting red eyes in digital images. In order to detect red eyes in a picture, a heuristic algorithm is first adopted to detect a group of candidate red regions, and then an eye classifier is utilized to confirm whether each candidate region is a human eye. Thereafter, for each detected red eye, a correction algorithm applies a correction. In case that a red eye cannot be detected automatically, another algorithm is also provided to detect red eyes manually with the user's interaction by clicking on an eye.

BRIEF DESCRIPTION

Aspects of the present exemplary embodiment relate to a system for correction of images and a method. In one aspect, the system includes a detection module which, for each of a plurality of pixels in a digital image, assigns a probability that the pixel is within a red eye. A classifier module classifies a patch of the image comprising a region of contiguous pixels which have at least a threshold probability that the pixel is within a red eye. The classifier module distinguishes patches which have a likelihood of including a red eye from patches which have a likelihood of including at least one of a face error and a background error. A correction module assigns a correction to apply to pixels in a region of contiguous pixels which are within a patch which the classifier identifies as having a likelihood of including a red eye.

In another aspect, an image processing method includes, for each of a plurality of pixels of a digital image, assigning a probability to the pixel of the pixel being in a red eye as a function of a color of the pixel. For a patch of the image comprising a region of contiguous pixels which have at least a threshold probability that the pixel is within a red eye, the method includes classifying the patch with a classifier module trained to distinguish patches which have a probability of including a red eye from other patches. For a patch of the image identified by the classifier as having a probability of including a red eye, a correction to apply to pixels in the region of contiguous pixels is determined.

In another aspect, a processing method includes, for each of a plurality of pixels in a digital image, automatically assigning a probability to the pixel of the pixel being in a red eye as a function of a color of the pixel. A region of contiguous pixels in the image is identified, in which the pixels have at least a threshold probability of being in a red eye. A patch which includes the region is automatically classified with a classifier module comprising a first classifier trained to identify patches which are more likely to contain red than face regions and with a second classifier trained to identify patches which are more likely to contain red than background regions. The classifier module assigns a patch to one of at least two classes, depending on outputs of the first and second classifiers. A parameter is assigned to the pixel which differs depending on to which of the classes the patch is assigned. For each of the plurality of pixels in the identified region, the method includes automatically determining a correction to apply to the pixel which is a function of the assigned probability that the pixel is within a red eye, the parameter assigned to the pixel, and the color of the pixel.

DETAILED DESCRIPTION

Figure 1:
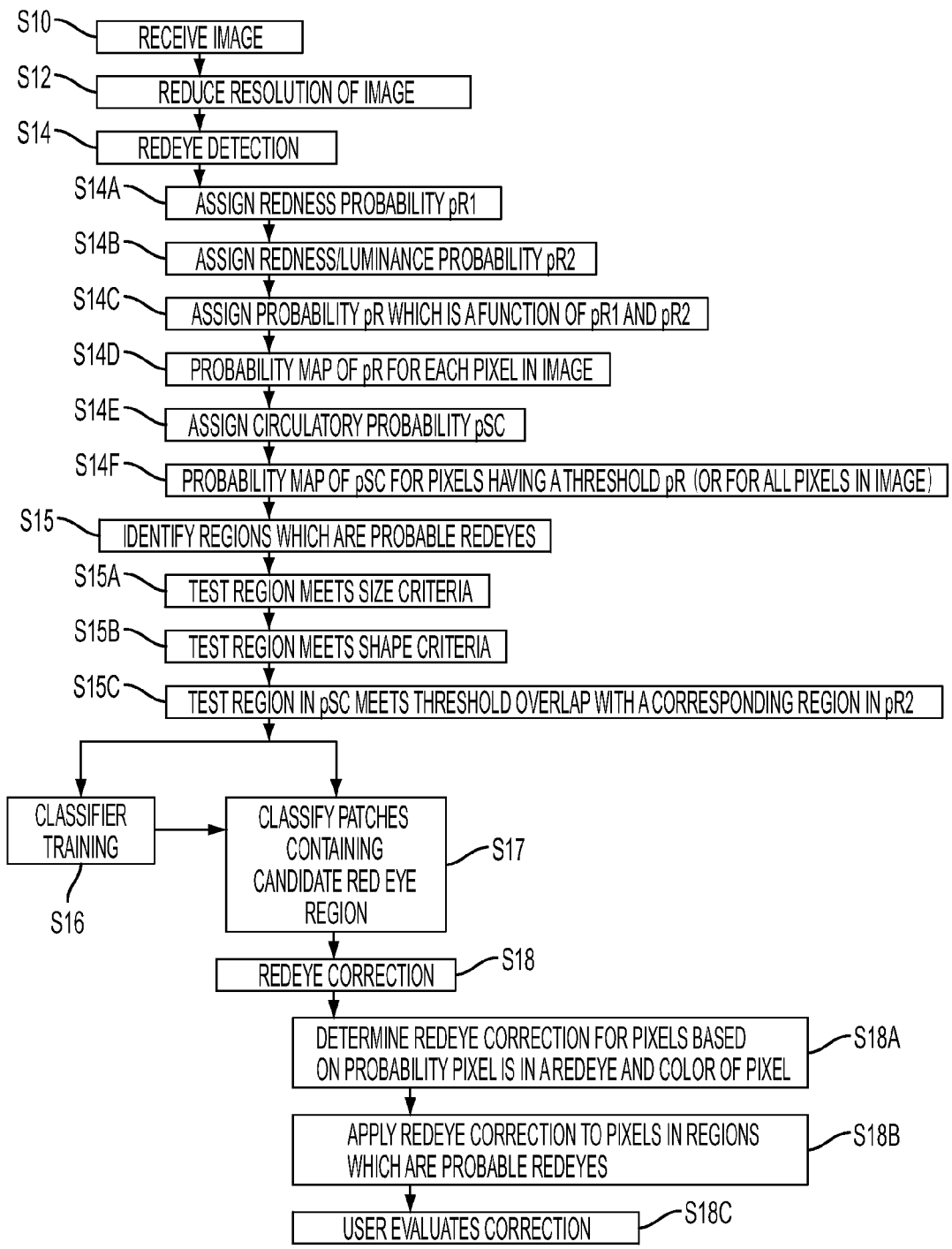
FIG. 1 is a flow diagram illustrating steps in an exemplary method for automatic correction of red eye in an image.

Aspects of the present exemplary embodiment relate to a system and method for addressing red eye in digital images. The system enables fully automated detection and correction of red eyes in the image processing stage, allowing the elimination of pre-flash hardware and its associated disadvantages. The images to be processed may be generated by a digital imaging device, such as digital camera, scanner, digital video recorder, or the like. An exemplary detection and correction system includes a processing module which includes software which may be incorporated into the digital imaging device or may be stored on a suitable image processing apparatus separate from the digital imaging device, such as a personal desktop computer, laptop, or a dedicated image processing system, such as a photofinishing apparatus. The, images to be processed are in digital form or are converted to digital form prior to processing. The image data can be defined by a plurality of pixel values expressed in terms of a color space, such as a red, green, blue (RGB) color space, or may be converted thereto.

Above-mentioned application Ser. No. 11/145,710 discloses a fully or substantially automated computer implemented process for identifying and correcting regions of digital images corresponding to red eyes. The method disclosed is probabilistic in the sense that a red eye detection module automatically assigns probabilistic values not binary values to pixels in candidate red eye regions. In particular, the detection module attributes to each image pixel, a red eye probability of from 0 to 1, with values in between being possible. Unlike other red eye detection methods whose outputs are binary (either yes, it's a red eye, or no, its not a red eye), these probabilistic values may result from a combination of different pixel features, e.g., reddish, luminance, and spatial circularity, which have been found to correlate with the region being a red eye in practice. The resulting probabilistic values are then used in a correction module to determine the amount of correction to apply to each pixel.

An additional automated classification step (performed by an associated classifier module) is now proposed which has been found to improve the results obtained by the above-described method. The additional classification step may be performed on an output of the above-described detection method, prior to correction of a digital image for red eyes. In other embodiments, the classification step may be combined with other automated red eye detection methods which evaluate digital images for identification of candidate red eyes.

In one aspect, the exemplary system includes a detection module, optionally a testing module, a classifier module, and a correction module. The detection module assigns pixels of a digital image a probability of being in a red eye based on one or more pixel features, such as color, luminance, and/or circularity of an area in which the pixel is located. Further tests may be performed by the testing module on a region of contiguous pixels each having a threshold red eye probability in order to filter out regions which do not pass the tests. For the eliminated regions, the probabilities may be set to zero or some relatively low probability value. The pixels in any remaining region or regions within the image (candidate red eye regions) retain at least some probability of being in a red eye and are spaced from other candidate red eye region(s) by areas which have been assigned low or zero probability of being in a red eye.

The classifier module receives as its input, the output of the detection module and/or testing module. The classifier module is trained, prior to actual use, to distinguish patches comprising the previously identified red eye regions whose local descriptors correspond to people's red eyes from patches whose local descriptors correspond to other parts of the face or background. During training, an objective is to learn to recognize patches whose local descriptors correspond to eyes and thus to identify candidate red eyes which were correctly detected by the detection module/testing module. In this way, patches which correspond to non-eye regions of the face or background which may otherwise be assigned a high probability of including a red eye due to their color and/or shape can have their probabilities of being a red eye reduced and thus receive little or no red eye correction in a correction step.

The patches, which each have as their center, a candidate red eye, are larger than the red eye region and, in general, are large enough to encompass an eye (if the candidate red eye is indeed a red eye). In general, the patches are smaller than the entire image area. For example, the patches may be sized to encompass the pupil (red eye), the iris, at least part of the white part of the eye at one or more sides of the iris, and part of the skin surrounding the eye. Each of these areas have features which are common to a large number of people, such as the color or relative gray level of each of the parts, and other features, such as shape or relative size, which can be used by the classifier module as local descriptors to distinguish between a patch which includes an eye and a patch which forms another part of a face or background of the image. The training set of patches which are used to train the classifier may include patches obtained from people of different ages, races, eye colors, skin colors, and the like so that features which differ for these groups are considered. The output of the classifier is a probability map in which the candidate red eye regions classified as being more likely to be red eye than face and more likely to be red eye than background have their probability values enhanced, as compared with the output of the detection module, while regions which are less likely to be red eye than face and/or less likely to be red eye than background are unchanged or have their probability values reduced.

The correction module receives as its input, the output of the classifier and applies a correction to pixels in the image as a function of the probability values output by the classifier and a color of the pixel. In general, pixels which have higher probability values/greater red component are given relatively more correction than pixels with lower probability/lower red content. In general, the correction involves reducing the red component of the pixel and increasing the green and blue components (in an RGB scheme). Thus, the classifier acts to increase the amount of correction (i.e., to decrease the red component more heavily) which is applied by the correction module to pixels in candidate red eye regions that the classifier has identified as being more likely to be red eye than face and more likely to be red eye than background. Additionally, the classifier may act to decrease the amount of correction (i.e., more of the original red component of the pixel is retained) applied to pixels in candidate red eye regions which are less likely to be red eye than face and less likely to be red eye than background. For regions where the classifier is inconclusive, the probability may be unchanged, i.e., the correction is the same as would be applied based on the output of the detector module.

An exemplary method for treatment of red eye in a digital image consists of a fuzzy (soft) red eye detection step, a classification step, and optionally a fuzzy (soft) red eye correction step. Thus, instead of making a hard (yes or no) decision about whether a pixel is in a red eye, a value is assigned to each pixel which generally corresponds to the likelihood that it is in a red eye and the correction process may involve a soft correction where each pixel to be corrected is corrected according to its individual probability. The classification step modifies the probabilities output in the soft detection step for at least a portion of the candidate red eyes, but may nevertheless retain a graduation in probabilities over the image (i.e., include values between 0 and 1).

Thus, the detection module, detection step, correction module, and correction step may operate as described in above-referenced application Ser. No. 11/145,710, except in that the output of the detection module/detection step is now the input of the classifier/classifier step and the input of the correction module/correction step is now the output of the classifier/classifier step.

In various aspects, the classification step is treated as a multi-class problem, distinguishing red eye, face, and background. In some aspects, the classifier module is trained on the output of the detection module rather than on an independent training set. In this way, during its training, the classifier module-need only consider the candidate red eyes which the detection module has identified, rather than a larger group of candidate red eyes, many or most of which would have been given a low probability of being in a red eye by the detection module and which, as a result, do not significantly help to refine the classifier module.

The proposed enhanced system and method can be employed in production printing particularly for reproducing and printing of digital and scanned photos. It also finds application in digital still cameras and other handheld set devices such as camera phones. In the great majority of cases the enhanced method substantially improves the red eye correction obtained by the previous method. It is also safer than the previous method in the sense that it furthermore reduces the number and strength of artifacts on the face and on the background.

Figure 2:
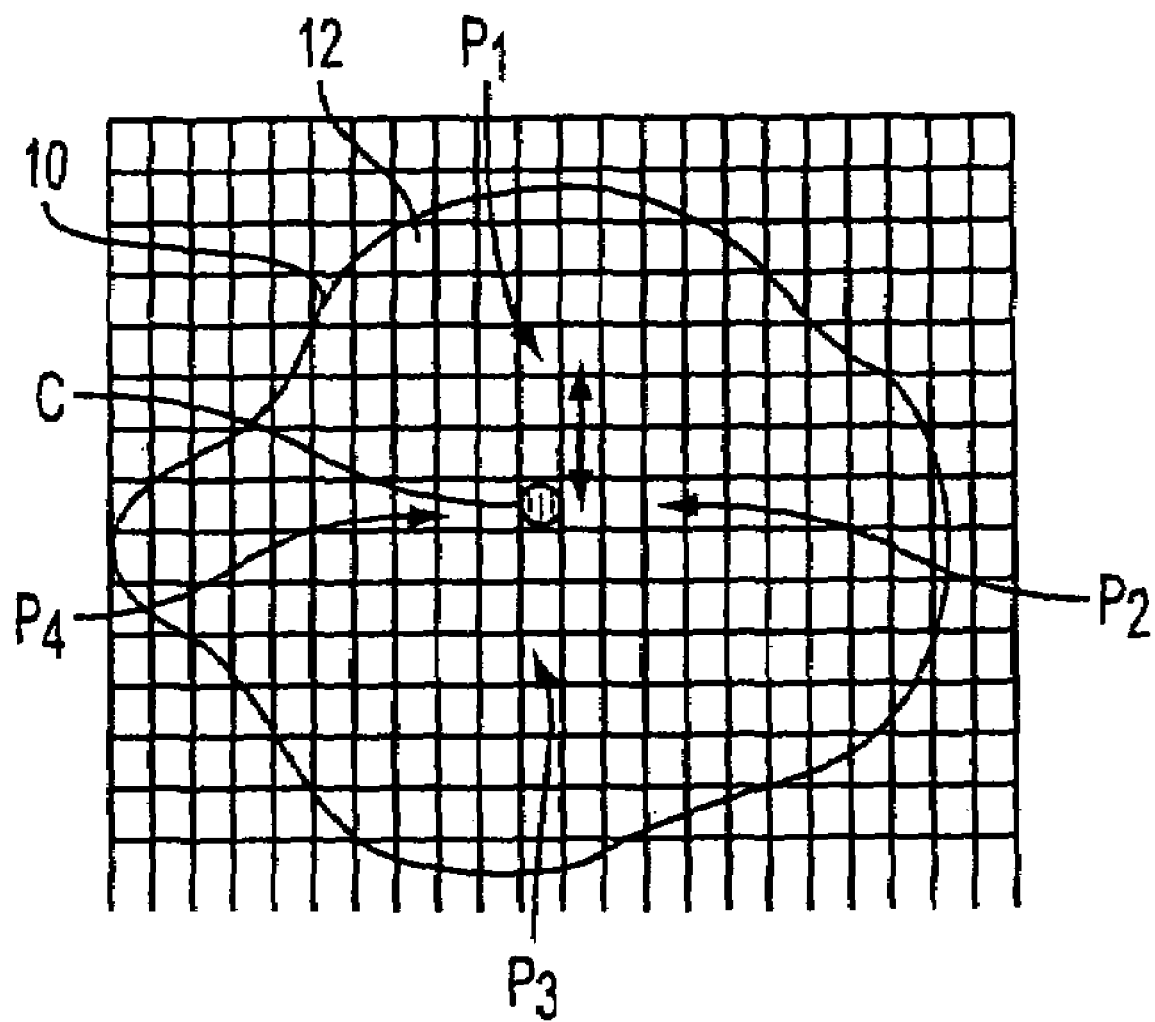
FIG. 2 is a schematic view of a portion of an image and a region surrounding a pixel to which a circularity probability is being assigned.
Figure 3:
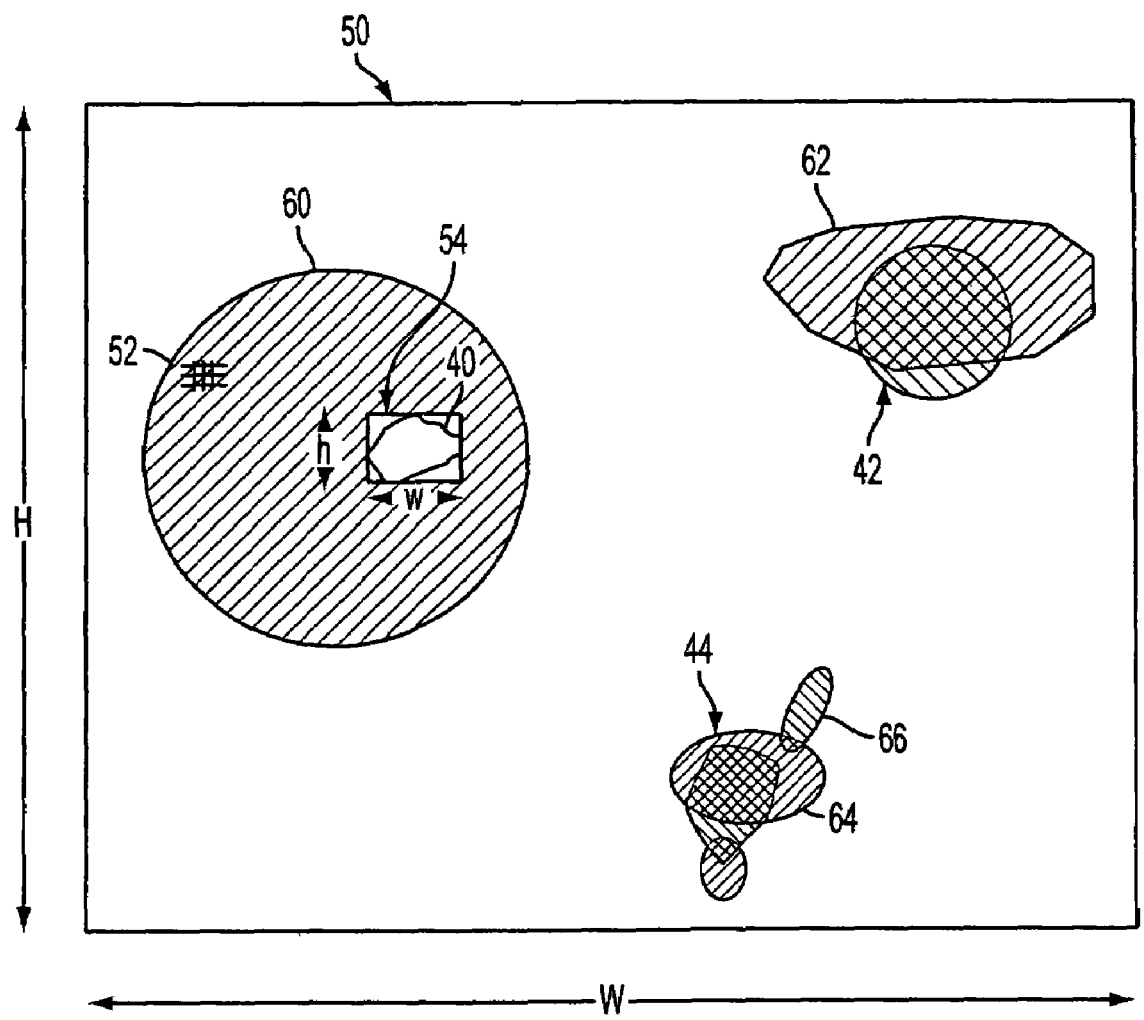
FIG. 3 is a schematic view of an image illustrating areas of consideration during red eye detection.
Figure 4:
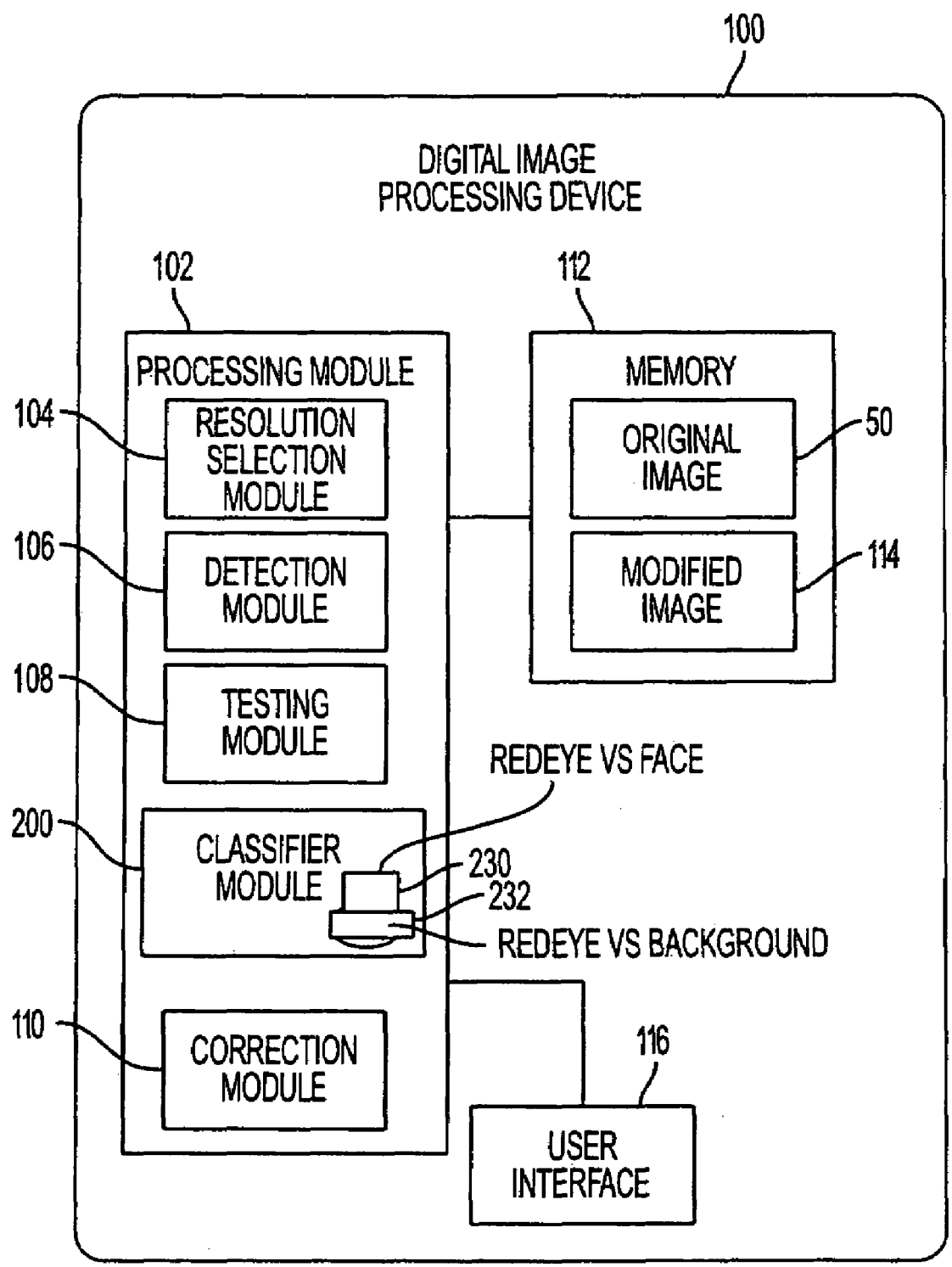
FIG. 4 is a schematic view of a digital device for performing the steps of FIG. 1.

The classification step will be described herein as a step which is performed on the output of the detection method of application Ser. No. 11/145,710. FIG. 1 illustrates the steps in an exemplary red eye detection and correction process essentially as described in that application and which includes a classification module training step (step S16) and the present classification step (step S17). FIG. 2 is a schematic view of a portion of an image and a region surrounding a pixel to which a circularity probability is being assigned and FIG. 3 is a schematic view of an image illustrating areas of consideration during red eye detection prior to the classification step. FIG. 4 is a schematic view of a digital device for performing the steps of FIG. 1. The exemplary digital imaging device or digital image processing apparatus 100 in FIG. 4 incorporates a processing component 102 which includes various processing components, herein illustrated as modules, including a resolution selection module 104 for determining the resolution of an image and generating a lower resolution image if appropriate. The processing component 102 also includes a detection module 106 which includes components for performing various red eye detection steps (step S14 of FIG. 1), a testing module 108 for applying further tests on candidate red eye regions (steps S15) and a correction module 110 for applying a correction to the digital image (step S18). The illustrated processing component further includes a processor 200 which will be referred to as a classifier module. The processing modules may communicate with a user interface 116 which allows a user to view the corrected image and accept or decline the correction. The digital device 100 includes suitable memory 112, accessed by the modules of processing component 102, for storing the outputs of the steps and the original and modified images. It will be appreciated that while classifier module 200 is illustrated as being a part of a processing component 102, it may be a separate component.

With reference to FIG. 1, a process for detection, classification, and optionally correction of red eyes begins at step S10 when a digital image is received by the digital image processing device 100 (FIG. 4).

The image may be stored on a disk, such as a DVD, CDROM, or floppy disk, or on other image storing medium and temporarily transferred to a memory of the image processing apparatus for processing.

Prior to performing the red eye detection, the resolution of the image can be reduced to a standardized number of pixels, such as 1 megapixel, to reduce the number of processing steps (Step S12). In the fuzzy detection step (S14), a detection module of the system evaluates pixels of the digital image based on one or more color and spatial characteristics of the pixel. In evaluating the color, the detection module may consider the redness and luminance (brightness) of the pixel, assigning probability values for one or both of these and/or a combined probability (substeps S14A, S14B, S14C, S14D). Taking into account the relation between redness and luminance allows the elimination (by assignment of a low probability) of a large proportion of false positives, such as skin and faces, that are more bright than red, whereas red eyes are usually more red than bright. Evaluation of the spatial characteristic (spatial circularity) (substep S14E) may include assigning a probability to the pixel related to the circularity of a region surrounding the pixel. The probability assigned in step S14E may be normalized over the probabilities obtained for the entire image.

As an alternative to luminance, some other characteristic commonly associated with red eyes can be evaluated, such as local contrast (whether the pixel is in a region adjacent one of contrasting color and/or brightness).

In aspects of the present embodiment, a redness probability pR1 and a redness/luminance probability pR2 are determined as a way to focus on the most probable red eye regions of an image (substeps S14A and S14B). The redness/luminance probability pR2 can incorporate the redness probability pR1 determined in step S14A. A combined probability pR, which is some function of the probabilities pR1 and pR2 can be determined to identify regions which have at least a minimum probability of being a red eye, in view of their color and luminance. (substep S14C). The output is a probability map of pR for all pixels in the image (substep S14D). A circularity probability. (pSC) for pixels of regions identified through the pR3 values of the pixels is then determined and assigned to each pixel, which may be based on the principle that, in practice, a more probable red eye region is surrounded by an improbable one (substep S14E). Further tests may then be applied to the remaining more probable red eye regions to eliminate false positives (pSC+tests) (substeps S15A and S15B). Further tests may be applied to all the remaining candidate red eye regions to eliminate even more false positives.

At step S17, patches which each encompass a candidate redeye, as output by the previous tests, are reviewed by a classifier module to identify those candidate red eyes which, based on the output of the classifier module, are more likely to be red eyes than face areas and more likely to be red eyes than background areas. In this step, the candidate red eyes which meet the classification tests may have their probability values increased, to values closer to 1, thus ensuring a somewhat greater degree of correction in a correction step S18, while candidate red eye regions which fail the classifier tests (more likely to be face than red eye and more likely to be background than red eye) may have their probability values reduced to values closer to or equal to zero. Red eyes for which the classifier results are ambiguous are left unchanged.

For the candidate red eye regions, probability values, such as pR2 values, as modified by the classifier step, are then used to modify (reduce) the red components of the prospective red eyes (step S18). This step includes determining the red eye correction to be applied (substep S18A) and correcting for red eyes (substep 18B), for example, by blending the original image with a "red reduced" image. pR2, as modified by the classifier step, better reflects the probability and amount of redness by which to reduce the pixel red component than pR1 or pR, although it is contemplated that these probability values (e.g., as modified by the classifier step) may be used in the correction step.

In the exemplary embodiment, all or a preponderance of the pixels in the image are evaluated for the three features: redness probability (pR1) (substep S14A), redness/luminance probability (pR2) (substep S14B) and circularity probability (pSC) (substep S14C), although it is also contemplated that the detection step may not involve calculating each probability pR1, pR2, an pSC for every pixel. For example, for regions or for individual pixels in which pR1 and/or pR2 are below a minimum threshold, i.e., low or zero (i.e., suggesting a low probability of a red eye), pSC may not need to be calculated. The output of step 814 may be a probability map that indicates, for each pixel evaluated, the probability (P) of the pixel being in a red eye (Substep S14F). At each step, scaling (e.g., normalization) can be performed such that for an image in which any pixel has a value greater than 0, the maximum value over the whole image becomes 1. Scaling can be achieved by dividing by the maximum value, but other non linear ways of scaling are also contemplated. Each subsequent processing substep (S14B, S14C, S14D, S14E) may rely on and improve the output of the preceding one.

Based on the probability map output at step S14, regions with a high probability of being a red eye are identified (step S15), further classified (step S16), and in a subsequent correction step (Step S18) the color of each pixel in these regions individually modified. As a result, a correction applied to one pixel in a red eye may differ from the correction applied to another pixel in the red eye.

For an image in which a red eye occurs, the probability map generated in step S14E is not binary but includes values between 0 and 1 (or other assigned maximum and minimum values), where 0 indicates the lowest probability that the pixel is in a red eye and 1 indicates the highest probability that the pixel is in a red eye. The values between 0 and 1 can be graphically represented as gray levels, with black corresponding to 0 and white corresponding to 1. As discussed above, this probability can be a combination of one or more different pixel features, such as color attributes (e.g., redness), luminance, and spatial circularity. After the classifier step (S17), the modified probability map may still include values between 0 and 1.

The color (redness probability) pR1 of the pixel (Step 14A) can be determined from a measure of the red component of the pixel and may include comparing the red component with complimentary color components, such as green and blue components of the pixel's color space. Depending on the color scale used, the color components can be expressed as numerical values, the higher the value, the greater the saturation. For example, in RGB color space, the color of a pixel is defined in terms of red, green, and blue components each being assigned a numerical value of, for example, from 0-255. The redness probability can take into account each of these values or just the red component. In one embodiment the extent to which a pixel is "reddish" (D) is determined by subtracting an average of the green (G) and blue (B) values from the red value (R) of the pixel, using the expression:

$$\text{Reddish}(D) = R - (G+B)/2 \qquad \text{Eqn. 1}$$

The redness probability (pR1) of a pixel being red can be obtained by scaling the reddish value obtained according to Eqn. 1, e.g., by dividing the reddish value (D) by the maximum reddish value ($D_{max}$) for the image and taking the maximum of this value and zero to eliminate negative values, which can be expressed as follows:

$$pR1 = \max(0, D/D_{max}) \qquad \text{Eqn. 2}$$

For example, for a pixel having the following values R=220, G=130, B=90, $$D = 220 - [(130+90)/2] = 110$$

If the maximum reddish value $D_{max}$ of the image is 220, $$pR1=\max(0, 110/220), \text{ in this case}, pR1=0.5$$

The output of substep S14A is thus a probability pR1, which is assigned to each pixel which equates to some relative measure of its redness. In the illustrated embodiment, the probability pR1 is a measure of the extent to which the pixel is more red than it is green and blue. Other color measures which are tailored to identify the degree to which a pixel is similar in color to a red eye are also contemplated. It will be appreciated that pR1 need not be a scaled value of D, for example, pR1 may be equal to D, or some other function of D.

The next substep (S14B) assigns a redness/luminance probability (pR2) to each pixel. The luminance (or brightness) of a pixel can be expressed in terms of the gray level (saturation) of the pixel. Thus, for example, a luminance or gray level (V) is determined for each pixel which is a weighted sum of the values for red, green, and blue. In one embodiment, the gray level is determined using the expression:

$$V=0.25*R+0.6*G+0.15*B \qquad \text{Eqn. 3}$$

where * is the multiplication function. The redness/luminance value (L) is then determined by subtracting the gray level from a function of the reddish value D, determined in Eqn. 1. In one embodiment, the function is 2D, as follows:

$$L=2*D-V \qquad \text{Eqn. 4}$$

L can be normalized by dividing by the maximum value of L ($L_{max}$) for the image. Any negative values can be set to zero. pR2 is thus determined from the expression:

$$pR2=\max(0, L/L_{max}) \qquad \text{Eqn. 5}$$

Eqn. 5 thus serves to identify reddish pixels (as identified in the substep S14A) which have a low gray level. Eqn. 5 thus gives an indication of whether the pixel is more red than it is bright, which is generally the case for red eyes. This eliminates a substantial portion of the false positives, e.g. on skin and face regions which present those characteristics.

In one embodiment, the output of substep S14B is thus a probability value pR2 for each pixel which takes into account the gray level V of the pixel and its redness D.

In the above example, where R=220, G=130, B=90, and if $L_{max}$ is 100

$$V=0.25*220+0.6*130+0.15*90=146.5$$

$$L=2*110-146.5=73.5$$

$$pR2=73.5/100=0.735$$

Alternatively, the pR2 value of a pixel can be determined according to the expression:

$$pR2=(R-LPF(R+G+B)/3)/255 \text{ or 0 if this is negative} \qquad \text{Eqn. 6}$$

where LPF denotes a low pass filter (for example, a 5×5 pixel square containing the pixel being evaluated). The average value of the R, G, and B values of the pixels in the low pass filter is thus divided by three and subtracted from the red value of the pixel. The result divided by the maximum value (255 in this case) to generate a value from 0 to 1.

The probability values pR1 and pR2 assigned in steps S14A and S14B are optionally combined into a single probability value pR, such as a product or weighted sum of pR1 and pR2 (substep S14C) which allows further processing to concentrate on the most probable red eye regions. For example, a combined redness and redness/luminance probability F can be obtained as the product of pR1 and pR2 and then normalized by dividing by the maximum value of F ($F_{max}$) over the image, with negative values set to zero, as follows:

$$F=pR1*pR2 \qquad \text{Eqn. 7}$$

$$pR=\max(0, F/F_{max}) \qquad \text{Eqn. 8}$$

Eqn. 8 thus reinforces the probability where both pR1 and pR2 have large values and reduces/sets to zero the probability where either pR1 or pR2 are low/zero. pR can thus be considered as the probability of the pixel being in a red eye in the sense of being reddish and also more reddish than bright. The probability pR thus provides an approximation of the probability that the pixel is similar in color and luminance to pixels which are in a red eye, in practice. The higher the value of pR, in general, the more likely it is that the pixel is in a red eye. pR (or alternatively pR2 or pR1) constitutes the input for the circularity probability calculated in the next step (substep S14E).

In substep S14E, a circularity probability value pSC may be assigned to each pixel (or to pixels in any region 10 identified as comprising pixels with at least a minimum value of pR3, such as pR3>0 or pR3>0.1). One aspect of this substep is to ensure that each candidate red eye is of circular shape and its width/height ratio is close to 1. The circularity probability value pSC of a pixel is thus related to the degree of circularity of a region in which the pixel is located; In one embodiment, the probability value pSC is computed on pR determined in substep S14C, above.

For example, as illustrated in FIG. 2, in substep S14E, a set S of pixels, P1, P2, P3, P4, etc., which are radially spaced by a selected distance r from the pixel C being evaluated and arcuately spaced an equal distance from each other, are selected. The set may include 4, 6, 8, or any convenient number of pixels. If each of the pixels P1, P2, P3, P4, etc in the set of pixels have an approximately equal pR probability, this suggests that the central pixel P has a high probability of being in a circular region. This is most significant at the perimeter 10 of the region 12 in which the pixel is located. By moving stepwise further away from the pixel and looking at a plurality of pixel sets of increasing radius, the circularity probabilities for each of these sets can be computed and an maximum probability, average probability, or other function which takes one or more of these into account can be determined. In one embodiment, a number of pixels $N_1, N_2 \ldots N_p$ (pixel count) at radius r and a circularity probability pSCr(C, r), is obtained for the central pixel C and the radius r, as the maximum, truncated if less than zero of the expression:

$$pSC(C,r)=\max(0, \tfrac{1}{2}*PixelCount*pR(C)-[pR(N_1)+\ldots+pR(N_p)]) \qquad \text{Eqn. 9}$$

where PixelCount is the number of pixels selected on the circle around C.

For example, for four pixels N S E W of the central pixel, values of the expression $$pSC(C,r)=\tfrac{1}{2}*4*pR(C)-[pR(N_1)+\ldots+pR(N_4)] \text{ are determined}$$

Values of pSC(C,r) are determined for different r values (e.g., seven sets of pixels at r values of 3, 5, 9, 13, 19, 23, 27 from the central pixel) are obtained. In one embodiment, the maximum value of pSC(C,r) over all considered radii PSC(C) is determined:

$$pSC(C)=\max(pSCr(C,r)) \qquad \text{Eqn. 10}$$

The value of pSC(C) is scaled, e.g., normalized by dividing pSC(C) by the maximum value of pSC(C) over the entire image $(pSC(C)_{max})$ to determine a normalized probability pSC, and truncating where less than 0, as follows:

$$pSC=\max(0,PSC(C)/(PSC(C)_{max}))\qquad\text{Eqn. 11}$$

This assigns a high probability pSC to pixels having a high probability pR surrounded by a circle of pixels with low probability pR.

In an alternative embodiment, the values of pSC(C,r) are averaged to determine pSC(C).

It will be appreciated that fewer than four or more than eight pixels can be selected for each set S, and that the pixels selected need not be equally spaced arcuately. It is also contemplated that different radial distances can be selected, e.g., r can be from 1 to 100 pixels (which may depend on the resolution of the image under investigation) as well as different numbers of sets of pixels, e.g., from 2 to 20 sets of pixels, in one embodiment, from 3 to 10 sets.

Other measurements of circularity are also contemplated. In general, the determination of circularity probability pSC assigns pixels which are towards the center of a substantially circular area having a high local contrast (i.e., a surrounding area of substantially different color and/or brightness) at the perimeter, a probability pSC which is greater than zero and can be up to 1, the value generally increasing as the circularity increases. For those pixels which are not a part of a substantially circular area having a high local contrast at the perimeter, a probability pSC of zero or close to zero is assigned.

In one embodiment, the value of pSC is not determined for all pixels. For example, pSC is only determined for pixels where pR is greater than 0 or greater than a minimum threshold value, for example, greater than a normalized value of 0.1. In another embodiment, the same value of pSC can be used for a set of pixels which are directly adjacent or closely adjacent to a measured pixel. For example, a set of 3×3 or 5×5 pixels is assigned the value of pSC of the central pixel. This can reduce the computation time considerably without an appreciable reduction in accuracy.

In general, therefore, the assigned probability pSC takes into account some measure of the circularity of a region defined by its redness value pR of which the pixel forms a part. The probability may also take into account, directly or indirectly, the local contrast of the pixel and the extent to which the area in which the pixel is located is bounded by a substantially non-red area.

The output of substep S14E is a probability map of assigned values of pSC for each pixel in the image (or for pixels in those regions which meet a threshold value of pR3) (substep S14F).

Optionally, one or more further tests are performed to determine whether a red eye correction is appropriate (Step S15). For example, these tests may evaluate those regions of contiguous pixels which have a minimum value of pSC (and/or pR) (Substeps S15A and S15B) to determine whether they meet size and/or shape criteria. These tests are designed to eliminate false positives, i.e., regions of contiguous pixels where the pixels have a minimum value of pSC and yet which are not likely to be red eyes, for example, because they are too large or too small in relation to the size of the image, or because they are too elongate or lack compactness. These tests are applied to regions comprising several pixels and are indicative of whether the region, as a whole, should be considered to be a red eye and thus warrant a correction. The tests allow certain regions to be eliminated from consideration as red eyes and for these, no correction is applied to the pixels in the region. For example if any of the tests is not met, the original redness value is kept and pR1, pR2, and/or pR3 is set to zero. In one embodiment, a region has to pass all the tests to be considered a red eye. If an area does not pass all the tests then the probability for all pixels within this area is set to 0 (and the original redness value is kept).

These tests may concern different characteristics of potential red eye regions, and can be applied to the probability map (pSC values) or an intermediate probability map (e.g., pR, pR1, or pR2). In an illustrated embodiment, they are applied to pSC.

As illustrated in FIG. 3, the potential red eye regions 40, 42, 44 are identified as regions of connected pixels exceeding a threshold probability of pSC which is greater than 0 and less than 1. The threshold probability may be, for example, from about 0.05 to about 0.2, e.g., about 0.1. There may be several potential red eye regions 40, 42, 44, in an image 50 which meet this threshold. For each of the regions 40, 42, 44, the width w and height of the region 40, 42, 44, are determined. The following tests are described with reference to region 40, although it will be appreciated that the tests are performed for each potential region 40, 42, 44 (or for each region which passes the preceding test or tests). Potential regions 40 which pass the tests are considered candidate red eyes for the classifier step S17.

The size tests (substep S15A) may include a first size test on each of the individual regions to determine that the region 40 is not too small with respect to the whole image 50. In this test the maximum width w and maximum height of h of the region are determined, for example, in terms of the number of pixels. The test is satisfied if:

$$w > j/100*s\text{Max}\qquad\text{Eqn. 12}$$

and $$h > k/100*s\text{Max}\qquad\text{Eqn. 13}$$

where sMax is the maximum of the width and height of the image 50 in pixels: sMax=max(W,H), and j and k independently can be, for example, from about 0.1 to about 0.5, e.g., about 0.25, e.g., $$w > 0.25/100*s\text{Max and}$$

$$h > 0.25/100*s\text{Max}$$

If a region 40 does not meet this test, i.e., it is too small in relation to the image, it is not considered to be a candidate red eye.

A second size test on each of the individual regions 40 may be to determine that the region is not too big with respect to the whole image. This test is satisfied where:

$$w < t/100*s\text{Min}\qquad\text{Eqn. 14}$$

and $$h < u/100*s\text{Min}\qquad\text{Eqn. 15}$$

where sMin is the minimum of the width W and height H of the image in pixels: sMin=min(W, H); and t and u independently can be, for example, from about 5 to about 20, e.g., about 10, e.g., $$w < 10/100*s\text{Min}\qquad\text{and}$$

$$h < 10/100*s\text{Min}$$

If the region 40 does not meet this test, i.e., it is too large in relation to the image, it is not considered to be a candidate red eye.

The shape tests (substep S15B) can include a first shape test on each of the individual regions 40 to determine that the region is not too elongate, i.e., the height is not substantially greater than the width, and the width is not substantially greater than the height. This test is satisfied if:

$$w<y*h \qquad \text{Eqn. 16}$$

and $$h<z*w \qquad \text{Eqn. 17}$$

where y and z independently can be for example, from about 1.5 to about 3. For example the width is less than about twice the height, and the height is less than about twice the width: $w<2*h$; $h<2*w$.

If the region does not meet this test, i.e., it is too elongate in either the width or height direction, it is not considered to be a candidate red eye.

A second shape test on each of the individual regions 40 may be to determine that the region is relatively compact. This test is satisfied where:

$$fpb>f \qquad \text{Eqn. 18}$$

where fpb is the fraction of pixels 52 within the region's rectangular bounding box 54 belonging to the region 40 and f can be from about 0.1 to about 0.3, e.g. about 0.25.

If the region 40 does not meet this test, i.e., it is too disperse, it is not considered to be a candidate red eye.

The output of steps S15 is a probability map which assigns a probability value P=0 for every pixel except for those pixels in candidate red eye regions which have passed each of the applied tests. For the pixels in the candidate red eye regions which pass the tests, the assigned probability value P=pR2 is retained. These candidate red eye regions are then subjected to the classification step (step S17).

It will be appreciated that fewer or greater than the four tests described above may be applied, and that a region may be considered a candidate red eye if at fewer than all the tests are satisfied, e.g., if at least a minimum number of the tests is satisfied, such as two or three of the tests.

Additional tests may optionally be conducted to reduce false positives further. For example, a fifth test (S15C) determines whether a region identified in steps S15A and B as a potential red eye (P>0) overlaps with a region of pixels having a high redness probability pR2 or pR1. As illustrated in FIG. 3, this test may include mapping any remaining potential red eye regions 40, 42, 44, (i.e., those potential red eye regions 40, 42, 44, which have not been eliminated in steps S15A and S15B above) and their probabilities from pSC onto the corresponding regions 60, 62, 64 in pR2. During this step, regions whose size changes too much between pR2 and pSC are eliminated, as for red eye regions the size should only change by a limited factor.

In this step, each potential red eye region 40, 42, 44, in pSC is first linked to the corresponding region 60, 62, 64, respectively, in pR2. For example, for each region 40, 42, 44 in pSC, all overlapping regions 60, 62, 64, 66 in pR2 are determined. Regions 60, 62, 64, 66 in pR2 are identified as connected regions of pixels exceeding about one quarter of the mean value of the probability that pR2 assigned to the pixels belonging to the region in pSC, although values of greater or less than one quarter are also contemplated, such as from 0.2 to about 0.3. From all overlapping regions, 60, 62, 64, 66 then the one that overlaps most (in terms of numbers of pixels) is chosen as the corresponding region 60, 62, 64.

Then, the size of the regions 40, 42, 44 in pSC is compared with the size of the overlapping region 60, 62, 64 in pR2, respectively, to check that the regions are of comparable size.

For example, for comparable regions 40, 60 the following test concerning the region size in number of pixels has to be passed:

$$np1>\tfrac{1}{4}*np2 \qquad \text{Eqn. 19}$$

where np1 is the number of pixels in region 40 (pSC)

np2 is the number of pixels in the corresponding region 60 (pR2)

Similar tests are performed for each corresponding pair of regions, 42, 62 and 44, 64.

If this fifth test is passed, and if the pR2 region 62, 64, 66 meets the desired size and shape criteria (S15A, S15B) concerning the characteristics of possible red eye regions, the pR2 region 62, 64, 66 is retained, together with its probability values P=pR2. After this step the probability map assigns a value of P=0 to every pixel except those in the region or regions selected from 62, 64, 66 corresponding to the corresponding red eye regions from pR2 that passed the size and shape tests. Optionally, the pR2 values are then scaled, e.g., by normalizing, dividing the value of pR2 by the maximum value of pR2 (pR2$_{max}$) over the entire image:

$$P=pR2/pR2_{max} \qquad \text{Eqn.20}$$

By way of example, in the image illustrated in FIG. 3, for region 40, the corresponding region 60 in pR2 is too large (the number of pixels in region 40<¼the number of pixels in region 60) and is thus eliminated—all pR2 values are set to 0 in region 40; i.e., for this region, P=0. For region 42, the corresponding region 62 in pR2 meets Eqn. 19 and thus region 42 probabilities are retained. For region 44, the corresponding region 64 has the greatest area of overlap with region 44 and thus region 44 is retained. Region 66, which is a region in pSc which overlaps with region 64 in pR2, has less of an overlap with region 44 than region 64, and thus does not play a part in the decision regarding region 44.

In one embodiment, step S15 is eliminated entirely and all the potential red eye regions 40, 42, 44 are considered candidate red eye regions for step S17.

It will be appreciated that the above-described red eye detection steps and optional tests applied to potential red eyes may include additional or fewer steps and that different methods may be employed for assigning a probability to a pixel of the pixel being in a red eye as a function of a color of the pixel and/or the size and/or shape of a contiguous region to which it belongs. In particular, when the additional classification step S17 is employed, it is possible to remove or relax one or more of the above presented constraints. The classification step S17 eliminates most of the errors which these optional tests are designed to identify. Thus, it is possible to relax certain constraints in order to miss fewer candidate red-eyes. The additional classification step diminishes the errors, and increases the correction, thus it is generally favorable to be overly inclusive in setting the constraints so that candidate red eyes which may be actual red eyes are not erroneously eliminated by the tests preceding the classification step.

The operation of the classifier module 200 and classification will now be described in greater detail. In one aspect, the classification step S17 describes a patch that encloses a candidate red eye region as output by the detection module 106. The exemplary candidate redeye red eye region 40 includes pixels which have at least a threshold probability of being in a red eye as a function of their color, as determined by the redeye detection module 106, which probability may also take into account other red-eye related features, such as luminance and circularity. For example, the candidate redeye region(s) subjected to the classifier may have a probability P=pR2 which exceeds a certain minimum value, and may have undergone further screening at step S15.

Prior to use, the classifier module 200 is trained in a training step S16 to recognize patches whose local descriptors correspond to people's eyes (and thus to correctly detected red eyes), and to distinguish them from patches corresponding to other parts of the face on one hand and pieces of background on the other hand that the detection module may incorrectly consider as possible red eyes. To improve accuracy, the recognition process may be treated as a multi-class problem, e.g., distinguishing red eye from face, and redeye from background. Additionally, by training the classifier module on the output of the detection module 106/testing module 108 and not on an independent training set, the training focuses on the most relevant patches.

In a user study, the importance of face errors (areas of the face which were incorrectly identified as red eyes and thus for which a correction was inappropriate) and insufficiently corrected actual red eyes were rated as being of higher importance than the importance of background correction errors (areas of the background incorrectly identified as red eye for which a correction was inappropriate). In particular, the user study showed that the importance of strongly visible face errors and insufficiently corrected red eyes is much higher than the importance of background errors. Indeed users often do not even notice modifications on the background. Instead, users focus much more on faces, and in particular on disturbing unnatural artifacts on faces on one hand and remaining red eyes on the other hand. This tendency of users to focus more on faces/eyes when looking at an image is combined with the users' natural skill at identifying face errors, perhaps because faces have a more limited set of identifiable features, such as eyes, nose, mouth, etc., than backgrounds, which can have a much wider range of features. Therefore, it is appropriate to treat face and background comparisons differently.

Training the classifier module 200 on the output of the detection module 106 (Step S16) provides a classifier module 200 which is specifically adapted to distinguish the true positives (actual red eyes) and false positives (incorrectly identified candidate red eyes) returned by the initial method (Steps S14 and S15). These two aspects result in more accurate red eye correction.

While a system 100 operating without the present classifier module 200 is effective as a fully automatic and probabilistic solution to detect and correct red eyes in the image processing stage, it has been found that in a limited number of cases, the system 100 may introduce disturbing artifacts on people's faces, particularly on lips or around noses. This may be because these regions tend to have similar coloration to red eyes. Additionally, the system may not always reach an optimal level of red eye correction, because the probability values (e.g., P=pR2) obtained for some correctly detected red eyes is not sufficiently high. Finally, the system may occasionally introduce artifacts on the background, for instance reducing the redness of a small red spot in the background of the image. The background, for purposes of discussion, includes all areas not located on people's faces. In general, the face includes the eyes (other than red eyes), nose, mouth, ears, and regions of skin surrounding these features, but excludes other skin regions, such as arms, legs, body, feet, and hands, which are considered as background. A portion of the neck which is visible above a person's clothes may also be considered as part of the face.

The proposed additional classification step S17 enables the red eye probabilities assigned to three different classes of regions (more likely to be red eye face and background) to be modified. In consequence this enables:

1) a reduction in the number and strength of artifacts introduced on face regions,
2) an increase the strength of correction applied to correctly detected red eyes, and
3) a reduction in the number and strength of artifacts introduced on background regions.

Although the exemplary embodiment is described in terms of three classes: eyes, face (other than eyes), and background (everything except face and eyes), it is contemplated that further classes may be provided. For example, the typical face errors, such as lips, nose, and other face errors may be separately analyzed, which may result in an even higher accuracy, although with increased processing and training requirements. Alternatively, a common class containing faces and background errors can be trained and its outputs combined with the outputs of the face versus red-eye and face versus background classifiers. In another embodiment, this common class can replace the preceding two classes and used alone to decide whether the patch is a red eye or not.

In one aspect, the classification step S17 results in increasing the probability assigned to the true positive red eye regions (as identified by the classifier) and reducing the probability of false positives (as identified by the classifier), i.e., wrongly detected red eye regions located on people's faces or on background.

A local descriptor of the patch enclosing the probable red eye region output by the detection module is used in the classification step S17. The classifier 200 includes processing capability for learning and recognizing patches whose local descriptors correspond to people's eyes (and thus to correctly detected red eyes), and for distinguishing them from false positive patches corresponding to other parts of the face or background respectively that are wrongly identified by the detection module 106.

The classification step S17 is based on a local description of patches enclosing the probable red eye regions. According to the location of the patch, each patch belongs to one of a plurality of classes. In the illustrated embodiment, three classes, red eye, face or background are employed. A machine learning approach is used at step S16 to train the classifier module 200 to distinguish between pairs of these three classes (redeye vs. face and redeye vs. background). Depending on the output of the classifier module 200, the probabilities of the candidate red eye regions may be adjusted. For example, the probabilities (P=pR2) may be raised for probable red eye regions in patches classified as both more likely to be red eye than face and more likely to be red-eye than background and reduced for patches classified with high confidence as either face or background by one of the classifiers. It should be noted that the confidence of having a face of a binary classifier face vs red eye is equivalent to the confidence of not having a red-eye. For patches which the classifier is unable to assign to one of these two groups with sufficient confidence, the probabilities may be left unmodified.

The classifier module 200 includes processing components which may be implemented on suitable software or hardware. While in FIG. 4, the classifier is illustrated as part of the processing module 102, it may be physically separated therefrom. The classifier module 200 receives inputs from the testing module 108, where present, or directly from the detection module 106. The output of the classifier module, such as modified probability values (Pclass), is input to the correction module 110.

Figure 5:
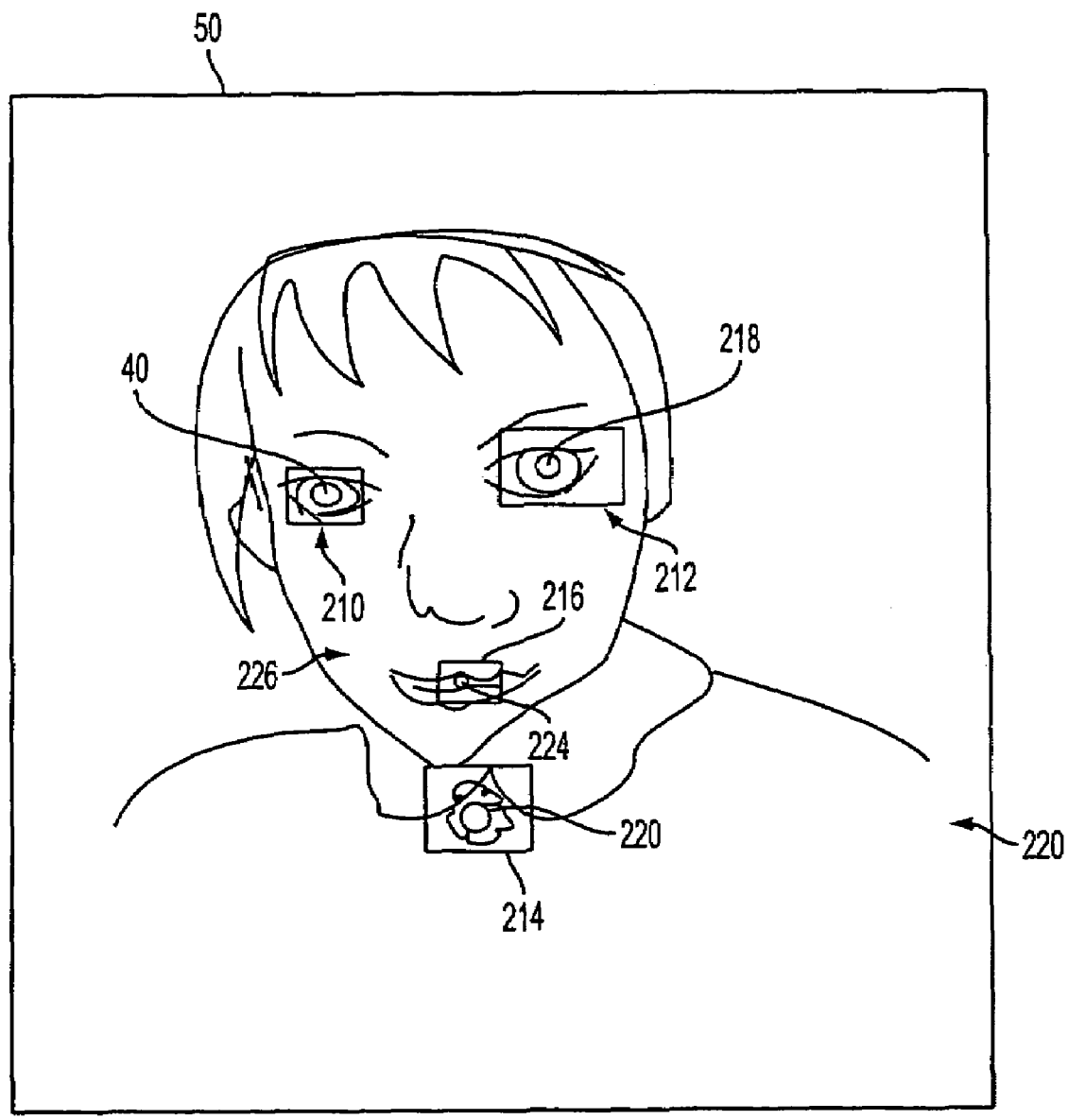
FIG. 5 is a schematic view of an image identifying patches which surround probable redeye regions.
Figure 6:
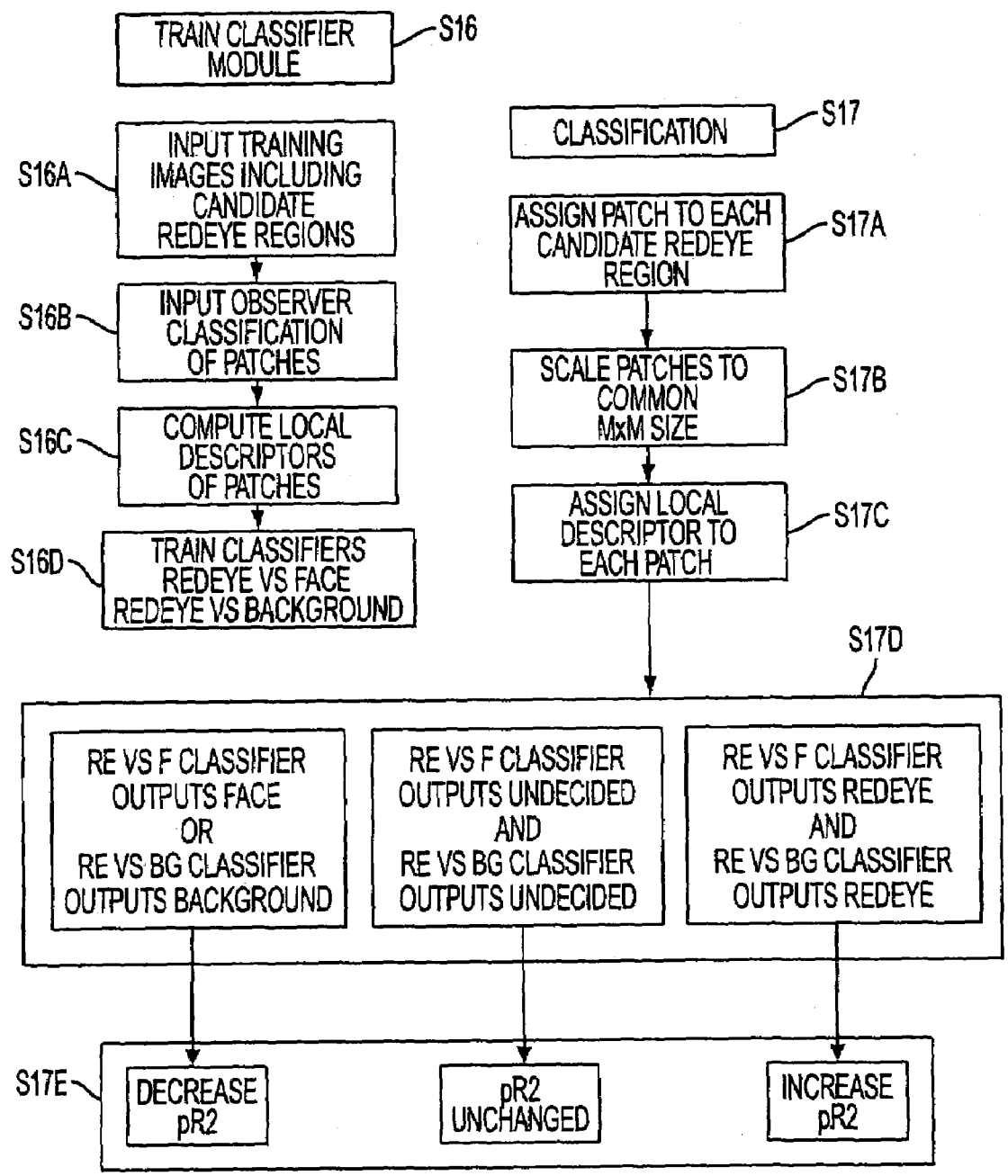
FIG. 6 is a flow diagram illustrating exemplary classifier training substeps and classification substeps for the method of FIG. 1.

With reference to FIGS. 5 and 6, a patch 210, 212, 214, 216 is assigned to each candidate red eye region (step S17A). Specifically, each candidate redeye is located with the center of its bounding box at the center of the respective patch. In the image 50 illustrated in FIG. 5, patches 210 and 212 enclose red eye regions 40, 218 corresponding to actual red eyes. Patch 214 encloses a circular bead 220 on a brooch, which is in a background region 222 of the image, while patch 216 encloses a red region 224 of the lips on a face region 226 of the image. It will be appreciated that FIG. 5 is exemplary only and that fewer or more candidate red eyes and consequently fewer or more patches may be identified in any given image. At this stage, the object is to identify which of the patches 210, 212, 214, 216 have a high probability of corresponding to actual eyes and thus enclose a red eye to be color corrected in the correction step.

The patch 210, 212, 214, 216 may be square or rectangular in shape, or any other suitable contiguous shape and may surround the respective candidate red eye region 40, 218, 220, 224. In general, the patches are spaced from each other, although it is contemplated that in some cases, the patches may overlap. For example, each patch 210, 212, 214, 216 may be at least as big as the bounding box 54 of the probable red eye region 40 (FIG. 3). In one embodiment, a patch area of $k^2$ times the bounding box of the candidate red eye region 40, 218, 220, 224, as output by the detection module 106 may be employed, where k can be, for example from about 2 to about 5. With k=3, the patch 210, 212 generally encloses the whole eye 228, 230 or a predominant part thereof, as shown in FIG. 5 (when the candidate red eye 40, 218 forms a part of an actual eye 228, 230). This allows a consideration of the features surrounding each of the candidate red eyes.

At step S17B, each patch 210, 212, 214 in the image may be scaled to a common size, e.g., a size of M×M pixels. M can be for example, from about 5 to about 100, such as from about 10 to 40. This rescaling allows different candidate red eyes to be brought to approximately the same resolution. In sample tests, M=32 gave satisfactory results. The size of M may depend, to some degree, on the processing capabilities of the device on which the system is implemented. In general, M should be large enough such that local descriptors of each patch, which take into account features of each resized pixel, allow the classifier module to distinguish between red eyes and other face or background areas when trained.

A local descriptor is computed for each rescaled patch 210, 212, 214 (step S17C). The local descriptor is used to represent the patches 210, 212, 214 surrounding the candidate red eye regions. The local descriptor may be a local texture descriptor such as gradient orientation histograms, wavelet and Gabor filters, or differential descriptors, as described, for example in K. Mikolajczyk and C. Schmid, "A Performance Evaluation of Local Descriptors", IEEE Transactions on Pattern Analysis and Machine Intelligence, Vol. 27, No. 10 (October 2005).

In one embodiment, the initial local texture descriptor obtained for each patch is a feature vector of dimension M×M (32×32=1024 in the illustrated embodiment). For example, the vector may include the gray value (e.g., the Reddish (D)=R−(G+B)/2 value) of each pixel in the M×M matrix. Before training/applying the classifier module, this dimension may be reduced through Principal Component Analysis (PCA). PCA is a useful technique for reducing the dimensionality of the data set by identifying a smaller set of uncorrelated variables that retains most of the sample's information. It determines principal dimensions along which the variance of the data is high defined by the eigenvectors of the covariance matrix corresponding to the n largest eigenvalues. PCA techniques are described, for example, in R. A. Calvo, M. Partridge, and M. A. Jabri, "A Comparative Study of Principal Component Analysis Techniques," Australian Conference in Neural Networks, Brisbane (1998) and in F. De la Torre and M Black, "Robust Principal Component Analysis for Computer Vision," International Conference on Computer Vision (2001).

The classifier module 200 may include two one-against-one classifiers: a first classifier 230, which is trained in the training step S16 to classify red eye against face and a second classifier 232 trained to classify red eye against background. Faced with an actual redeye, both classifiers are trained to output "red eye." Presented with a face error, the first classifier is trained to output "face," while the second classifier could output "eye" or "background" because it is not trained to distinguish between red eye and face. In one embodiment, the classifiers output a confidence level, the higher confidence levels being associated with a greater level of certainty of the classifier that the classification is correct. Thus, in the case of a face error, for example, the red eye vs. face classifier is trained to classify the face error as Face and to assign a high level of confidence to that decision. The background classifier could identify the face error as either Red Eye or Background when presented with the face error, because it is not specifically trained to make that determination, but would assign a relatively low level of confidence to that determination. In such a case, the classifier may be trained to output Undecided. A threshold confidence level may be established for the Face and Background determinations, above which the output is Face (in the case of the Red Eye vs. Face classifier) or Background in the case of the Background classifier and below which the output is Undecided.

At step S17D the classifiers classify the patches based on their local descriptors. In one embodiment, the outputs of the two one-against-one classifiers are combined, as follows: if both classifiers 230, 232 classify the patch 210, 212, 214 as Red Eye, it is treated as a Red Eye (Step S17E). If at least one classifies the patch as being Non-Eye, i.e., a Face or a Background (with a high level of confidence), it is treated as Not Red Eye. A combination of two Undecided decisions is treated as Undecided. Other schemes may also be envisaged, based on weighting different levels of confidence.

At step S17E for those patches classed as Red Eye, the probability values (e.g., P=pR2) of pixels within the candidate redeye region of the respective patch are increased by applying a first parameter PRE. For those patches which are classed as Not Red Eye, the probability values (e.g., P=pR2) of pixels within the candidate redeye region of the respective patch are decreased by applying a second parameter setting $P_{NRE}$. The probability values of the pixels in the candidate redeye regions of those patches which are classed as Undecided can be left unchanged.

Alternatively, the probability values can be modified using a third parameter setting $P_{UND}$ for those classed as Undecided or three new parameter setting $P_{UND-RE}$, $P_{UND-F}$ and $P_{UND-B}$ as a function of whether the confidence of having red eye (by combining both classifiers' answer), face, or background is the highest. These parameters may differ based on user preferences. However, they both result in less modification to P than the first and second parameters.

Another alternative is to use instead of the second parameter setting $P_{NRE}$, two parameter setting $P_F$, two $P_B$ as a function of whether the confidence of having face or background is the highest. In one embodiment, the decrease of the probability values (e.g., P=pR2) of pixels is greater for face than background ($P_F > P_B$).

At step S17E, the probabilities P for those pixels corresponding to the patches that the classifier module 200 considers red eye are raised to obtain probability values closer to one, and the probabilities for patches considered not red eye are lowered to values closer to 0. In one aspect, the probability values associated with patches that the classifier module 200 considers undecided are left unchanged.

The training step S16 will now be described. The classifier module is input with a group of training images containing candidate red eyes which have previously been identified as such by the detection module/testing module (step S16A). Each of the candidate red eyes is evaluated by a group of observers and placed in one of three classes: actual redeye, face error, and background error. These classifications of each candidate red eye are input to the classifier module (step S16B). Local descriptors for each candidate redeye are then computed (Step S16C). The redeye vs. face classifier 230 identifies features of the actual redeye vectors which distinguish them from the vectors of the known face errors and uses these to provide a method of assigning unknown candidate errors as likely red eyes or likely face errors (Step S16D). Similarly, the redeye vs. background classifier 232 identifies features of the actual redeye vectors which distinguish them from those of the known background errors and uses these to provide a method of assigning unknown candidate errors as likely red eyes or likely background errors. Features may include the shape, size, relative position, and/or orientation of groups of contiguous pixels with similar gray levels. Various methods for training the two classifiers 230, 232 to identify distinguishing vector features are contemplated. In one implementation, a linear Support Vector Machine (SVM) learning technique is used to train each classifier (step S16D). However, other machine learning techniques can be used, such as Neural Networks, Linear Discriminant Analysis, k-nearest neighbors, Gaussian mixture models or other machine learning techniques.

Examples of such techniques are described in C. J. C. Burges, "A Tutorial on Support Vector Machines for Pattern Recognition," Data Mining and Knowledge Discovery, Vol. 2, Number 2, p. 121-167 (Kluwer Academic Publishers, 1998); W. Duch, K. Grudzinski, and G. H. F. Diercksen, "Minimal Distance Neural Methods," Proc. I.J.CNN, pp. 1299-1304 (1998); and W. Duch, R. Adamczak, and G. H. F. Diercksen, "Distance-based Multilayer Perceptions," CIMCA pp. 75-80 (Ed. M. Mohammadian, IOS Press, Amsterdam); Pires, A. M., "Robust Linear Discriminant Analysis and the Projection Pursuit Approach, Practical Aspects, Developments in Robust Statistics," International Conference on Robust Statistics Heidelberg 2001, pp. 317-329 (Springer-Verlag 2003); S. Singh, J. F. Haddon ,and M. Markou, "Nearest Neighbour Strategies for Image Understanding," Proc. Workshop on Advanced Concepts for Intelligent Vision, Systems (ACIVS'99), Baden-Baden, (2-7 Aug., 1999); Richard J. Povinelli, Michael T. Johnson, Andrew C. Lindgren, and Jinjin Ye, "Time Series Classification using Gaussian Mixture Models of Reconstructed Phase Spaces," IEEE Transactions on Knowledge and Data Engineering, vol. 16, No. 6, pp. 779-783 (June 2004).

The classifiers 230, 232, after training, may include a model, such as a model in N-dimensional space, in which the patches which correspond to red eyes are in a bounded space which is distinguished from the rest of the N-dimensional space corresponding to face or background errors, respectively. Any new patches are compared with the N-dimensional space to determine whether they fall within the bounded red eye space and thus are considered likely to be red eyes.

While pixel gray level is one method of describing each pixel in the M×M matrix, other pixel features may be used in developing the local descriptors patches and the type of classifier to apply. A different feature could for example combine different texture information, as described, for example, in Mikolajczyk, et al., referenced above, with different color information, as described, for example, in John R. Smith and Shih-Fu Chang, "VisualSEEk: A Fully Automated Content-Based Image Query System," ACM Multimedia (1996).

At step S16E, modification parameters are input to the classifier module 200. User preferences may be used in determining the extent to which the probabilities (e.g., P=pR2) are modified as a result of the classification step. For example, in training step S16F, the parameter setting $P_{RE}$ can be assigned to candidate red eye regions designated by the classifier as more likely to be red eyes than face errors ($P_{Red\ eye} > P_{Face}$) and which are also more likely to be red eyes than background errors ($P_{Red\ eye} > P_{Background}$). Another parameter setting $P_{NRE}$ can be assigned to regions which the classifier determines are likely to not to be red eyes, i.e. highly probable to be face error ($P_{Face}$ close to 1 or bigger than a given threshold) or background error ($P_{Background}$ close to 1 or bigger than a given threshold). The parameter settings are subsequently applied by the classifier module to the probabilities P at step S17E.

Optionally, the corrected images in the training set may be reviewed by a set of observers and the parameters modified, as appropriate. A range of different values of parameter settings $P_{RE}$ and $P_{NRE}$ can be applied . The observers review the images and identify images where the corrected image is preferred to the uncorrected image. From these comparison tests, the parameter settings $P_{RE}$ and $P_{RE}$, which are most likely to result in the corrected images being preferred, are identified (training step S16F). Other ways of refining the parameter settings can be envisaged. In general, the parameter setting $P_{RE}$ results in an increase in the probability value output by the detection module while parameter setting $P_{NRE}$ results in a decrease in the probability value output by the detection module. For example, the probability P (e.g., pR2) may be modified by the appropriate parameter setting, i.e., $P_{Class}$=P modified by $P_{RE}$ if $P_{Red\ eye} > P_{Face}$ and $P_{Red\ eye} > P_{Background}$ $P_{Class}$=P modified by $P_{NRE}$ if $P_{Face}$ or $P_{Background}$ exceeds a threshold confidence level.

$P_{Class}$=P or P modified by $P_F$ if $P_{Face} > P_{Background}$ $P_{Class}$=P or P modified by $P_B$ if $P_{Face} \leq P_{Background}$ where $P_{Class}$ is the probability value output by the classifier. The parameter settings $P_F$ and $P_B$ can both be set such that P is unchanged. Or, these parameter settings may have different values, based on observer preferences, but in any case, will result in less of a modification to P than both $P_{RE}$ and $P_{NRE}$ provide. It is to be appreciated that the parameter settings need not be multiplicators but can be other functions which increase P (in the case of $P_{RE}$) or decrease P (in the case of $P_{NRE}$) In general, when the parameter setting $P_{RE}$ is applied, $P_{Class} > P$ and $P_{Class} \leq 1$ and When parameter setting $P_{NRE}$ is applied $P_{Class} < P$ and $P_{Class} \geq 0$.

Depending on the application different parameters or operating choice points can be chosen. For example, where it is known that the images to be modified are unlikely to contain faces or where a flash is not used, the parameter settings may be adjusted to correct fewer red eyes. Or, the classifiers may be trained to indicate a redeye vs. a face or background only when the local descriptor indicates a high likelihood that the candidate region is not a face or background error.

Alternatively, a more complex combination (e.g. weighted averaging) of the individual classifier outputs and their confidence measures can be considered. This leads to confidence measures which combine well with the probability map of the detection step (S14), and allows maintaining the soft (probabilistic) characteristic of the whole system. Moreover the classifiers can be tuned individually to penalize more severely false detections on faces than false detections on background. In one embodiment, the parameter settings are adjusted as a function of the confidence of each classifier 230, 232 that the patch vector is a redeye.

The objective of the training step is for each classifier 230, 232 to be trained to correctly assign "red eye" (or a high probability of red eye, where a weighting scheme is used) to actual red eyes, to correctly assign "not red eye" (or a low probability of red eye) to those which are not red eyes, and optionally to minimize the number of undecided red eyes (or those with a combined probability of close to 0.5). It will be appreciated that the classifier may still have a percentage of errors, but these are lower than when the method is performed without the classifier module 200. For example, the classifiers 230, 232 are trained to correctly identify patches 210, 212 as containing red eyes (red regions 40, 216) and to discount patches in the face 226 or background 222, such as patches 214, 216.

Returning to the method, the next step (Step S18) is determining a red eye correction for each pixel having a probability P=Pclass of>0. This is analogous to step S16 of application Ser. No 11/145,710, although in this case, the probabilities P which are used are as modified by the classification step S17.

In one embodiment, the higher the probability P, the greater the correction which is applied to the pixel. The correction can include increasing the blue and green components of the pixel and/or decreasing the red component of the pixel. In another embodiment, where a pixel has a probability P above a certain threshold, the red component of the pixel is set to zero.

For those pixels where a red eye correction is to be made, the correction can take into account the color of the pixel, in terms of, for example, the red, green, and blue components of the pixel in question as well as the probability that the pixel is a red eye pixel. This allows the saturation of the image to influence the correction and results in a correction which is more likely to reflect the saturation of surrounding areas.

For example, a red reduced value redReduced is assigned to the pixel which is a function of the green and blue values. For example, the red reduced value is an average of green and blue:

$$redReduced=(G+B)/2 \qquad \text{Eqn. 21}$$

The G and B values are kept the same. Thus, in the exemplary pixel where R=220, G=130, B=90, redReduced=110. The probability P of the pixel being a red eye is used to determine the relative contributions of the original red value and the red reduced value to the final red value in the image. The higher the value of P, the greater the weight that is placed on the red-reduced value. For example, the corrected red value Rcorrected can be determined from the expression:

$$Rcorrected=(1-P)*original+P*(redReduced) \qquad \text{Eqn. 22}$$

Thus, for P=¼, in the illustrated pixel, $$Rcorrected=\tfrac{3}{4}*220+\tfrac{1}{4}*110=192.5=193$$

The red value is thus reduced in the final image from 220 to about 193, while the original green and blue values are retained. Thus the modified pixel is R=193, G=130, B=90.

In another embodiment, the red value is adjusted by raising the P value to a power. The modification of a pixel can thus be based on the following equation:

$$Rcorrected=(1-P^{\wedge}(1/degree))*Roriginal+P^{\wedge}(1/degree)*redReduced \qquad \text{Eqn. 23}$$

in which Roriginal is the red value of the input image, redReduced is the red-reduced value of R, and degree is an algorithm parameter controlling the respective weight of the original and the redReduced values. Degrees of integer values from 1 to about 4 generally give good performance. In equation 22 above, the degree is 1. It is also contemplated that P^(1/degree) may be considered as the probability rather than P itself, thus the equation can be considered as:

$$Rcorrected=(1-P))*Roriginal+P*redReduced \qquad \text{Eqn. 24}$$

Where the image being evaluated is a low resolution image of an original image, the pixels in the original image which correspond to a pixel of the low resolution image for which a P value has been determined are all corrected in this last step by calculating redReduced values for each corresponding pixel in the original image and applying the same value of P to determine Rcorrected for each of these corresponding pixels.

In one embodiment, a user input allows a user to view the red eye corrected image and accept or decline the correction (Substep S18C).

The various steps for determining the probabilities and applying the correction can be incorporated into software as an algorithm which automatically evaluates images and applies red eye correction.

The classification module has been shown to visually improve corrections of actual red eyes by applying a greater correction. Background errors, which occasionally result without the classifier, such as in the brooch 218 are significantly reduced with the classifier module. The classifier module also reduces errors in correction of non-red eyes on the face by eliminating errors, particularly on the nose and lips.

When evaluating the exemplary method on an image database, it was found that nearly all face errors which observers considered undesirable were eliminated. Furthermore in the vast majority of cases, the red eye correction was substantially improved.

The present method is robust to variations in size and orientation within the considered region even using a relatively small training set.

The classification step integrates completely with a probabilistic method. Its output is used to adapt the initial probabilities assigned to the candidate regions, not as a yes/no decision. In the end, the pixels have assigned probabilities where not only 0 or 1 are possible values, but all intermediate values are equally possible. In contrast, existing methods end up with hard decisions on being red eye or not.

Without intending to limit the scope of the exemplary embodiment, the following example describes the effectiveness of employing the classification steps described above in a red eye detection method.

EXAMPLE

A red eye image database containing nearly 300 images, with a total number of 450 red eye patches, 215 face patches, 1750 background patches (as identified by human observers) was used in testing the classifier module.

The classification step was carried out within a Matlab prototype using local gradient orientation histograms as patch descriptors for which the dimensionality was reduced from 128 to 30 with PCA. The results illustrate the improvements achieved by integrating the classification step as described in a red eye detection method.

With five-fold cross validation, TABLE 1 lists the results which were obtained with the classifier module 200 for the different types of patches returned as red eye by the detection and testing modules 106, 108 using the method as described in application Ser. No. 11/145,710:

TABLE 1

| Classification Results | Initial Method Results | | |
|---|---|---|---|
| | True Positives (Red Eye) | False Positives on Faces | False Positives on Background |
| Correctly classified | 75% | 80% | 57% |
| Incorrectly classified | 10% | 7% | 2% |
| Undecided | 15% | 13% | 41% |

This table separates in columns the different types of patches returned as red eyes by the initial detection method (Steps S14 and S15), namely the true positive red eye patches, the false positive face patches, and the false positive background patches. The first row shows the percentage of patches that the classifier module correctly classified as red eye or not red eye respectively. It illustrates that the classifier module correctly recognizes the vast majority of red eyes as such (75%) and correctly eliminates the vast majority of face errors (80%). It also correctly eliminates the majority of background errors (57%). As shown in the second row of the table, the percentage of incorrectly classified patches is quite low.

Although at first glance the number of face and background patches may seem high, it should be borne in mind that those errors are often negligible in size and in probability value P, i.e. result only in very slight modifications to the image.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An image processing method comprising:
    with a computer processing component, for each of a plurality of pixels of a digital image, assigning a probability to the pixel of the pixel being in a red eye as a function of a color of the pixel;
    for a patch of the image comprising a region of contiguous pixels which have at least a threshold probability of being within a red eye, classifying the patch with a classifier module trained with candidate redeyes assigned manually to one of three classes, the classes including an actual redeye class, a face error class, and a background error class, to distinguish patches which have a probability of including a red eye from other patches which have a probability of including a face error and patches which have a probability of including a background error; and
    for a patch of the image identified by the classifier module as having a probability of including a red eye, determining a correction to apply to pixels in the region of contiguous pixels.

2. The method of claim 1, further comprising:
    training the classifier module to distinguish patches which have a probability of including a red eye from other patches using a training set of images, each image in the training set comprising a region of contiguous pixels which have at least the threshold probability of being within a red eye.

3. The method of claim 2, wherein the training set excludes images comprising regions of contiguous pixels for which tests have established that the regions are not likely to comprise red eyes.

4. The method of claim 1, wherein the determined correction is a function of a color of the pixel.

5. The method of claim 1, wherein the correction is a function of an output of the classifier module.

6. The method of claim 1, wherein the classifier module comprises:
    a first classifier which distinguishes patches which have a probability of including a red eye from patches which have a probability of including a face error; and
    a second classifier which distinguishes patches which have a probability of including a red eye from patches which have a probability of including a background error; and
    wherein the classifying of the patch includes classifying the patch with the first classifier and classifying the patch with the second classifier.

7. The method of claim 6, wherein the classifying of the patch includes assigning the patch to one of at least two classes, a first class comprising patches for which the first and second classifiers both identify the patch as having a probability of including a red eye and a second class comprising patches for which at least one of the following two conditions is satisfied:
    the first classifier identifies the patch as having a probability of including a face error, and
    the second classifier identifies the patch as having a probability of including a background error.

8. The method of claim 7, wherein the determined correction is a function of the class to which the patch is assigned.

9. The method of claim 8, wherein in the event that the patch is assigned to the first class, the determined correction for a pixel in the patch is a function of both the probability that the pixel is in a redeye and a parameter which increases the probability; and
    wherein in the event that the patch is assigned to the second class, the determined correction is a function of both the probability that a pixel is in a redeye and a parameter which decreases the probability.

10. The method of claim 7, wherein the classifying of the patch includes assigning patches to one of the first class, the second class and a third class of patches comprising patches for which the first classifier is undecided as to whether the patch includes a face error and the second classifier is undecided as to whether the patch includes a background error.

11. The method of claim 10, wherein in the event that the classifier module assigns the patches to the third class, the determined correction is a function of the probability that a pixel is in a redeye.

12. The method of claim 1, wherein the probability that the pixel is within a red eye is assigned to all pixels in the digital image.

13. The method of claim 1, wherein the probability of the pixel being in a red eye is scaled over the digital image.

14. The method of claim 1, wherein the assignment of the probability includes determining a redness probability which is a function of red, green, and blue components of the pixel.

15. The method of claim 1, wherein the probability that the pixel is in a red eye is a function of the extent to which the pixel is more red than it is green and blue.

16. The method of claim 1, wherein the assignment of the probability that the pixel is within a red eye includes assigning a redness/luminance probability which is a function of the extent to which the pixel is more red than it is green and blue and also the extent to which the pixel is more red than bright.

17. The method of claim 1, wherein a plurality of the pixels in the image are assigned a probability of the pixel being in a red eye of between 0 and 1.

18. The method of claim 1, wherein the correction of the pixels includes replacing a red component value of the pixels having a probability of being in a red eye of greater than a threshold value with a corrected red component value.

19. The method of claim 18, wherein the corrected red component value is a function of the red, green, and blue components in the pixel and of the assigned probability that the pixel is within a red eye.

20. The method of claim 1, wherein the image is a low resolution image of an original image and the method further comprises:

forming the low resolution image; and determining the correction to apply to pixels in the original image which, for each of the pixels, is a function of the assigned probability that the corresponding pixel in the low resolution image is within a red eye, the color of the pixel in the original image, and a class to which the patch containing the region is assigned by the classifier.

21. A processing method comprising:

for each of a plurality of pixels in a digital image, automatically assigning a probability to the pixel of the pixel being in a red eye as a function of a color of the pixel with a detection module of a digital image processing device;

identifying a region of contiguous pixels in the image, which pixels have at least a threshold probability of being in a red eye;

automatically classifying a patch which includes the region with a classifier module comprising a first classifier trained to identify patches which are more likely to contain a red eye than a face regions and with a second classifier trained to identify patches which are more likely to contain a red eye than a background regions and to assign a patch to one of at least two classes, depending on outputs of the first and second classifiers;

assigning a parameter to the pixel which differs depending on to which of the classes the patch is assigned; and for each of the plurality of pixels in the identified region, automatically determining a correction to apply to the pixel which is a function of the assigned probability that the pixel is within a red eye, the parameter assigned to the pixel, and the color of the pixel.

22. A system for correction of images comprising:

a detection module which, for each of a plurality of pixels in a digital image, assigns a probability that the pixel is within a red eye;

a classifier module which classifies a patch of the image comprising a region of contiguous pixels which have at least a threshold probability of being within a red eye, the classifier module including;

a first classifier which distinguishes patches which have a probability of including a red eye from patches which have a probability of including a face error; and a second classifier which distinguishes patches which have a probability of including a red eye from patches which have a probability of including a background error; and a correction module which assigns a correction to apply to pixels in a region of contiguous pixels which are within a patch which the classifier identifies as having a likelihood of including a red eye.

23. The system of claim 22, wherein the correction applied by the correction module is a function of a color of the pixel.

24. The system of claim 22, wherein the assigned correction is a function of an output of the classifier module.

25. The system of claim 22, wherein the classifier module assigns patches to one of at least two classes, a first class comprising patches for which the first and second classifiers both identify the patch as having a probability of including a red eye and a second class comprising patches for which at least one of the following two conditions is satisfied:

the first classifier identifies the patch as having a probability of including a face error, and the second classifier identifies the patch as having a probability of including a background error.

26. The system of claim 25, wherein the correction applied by the correction module is a function of the class to which the patch is assigned.

27. The system of claim 26, wherein the correction applied is a function of the probability that a pixel is in a redeye modified by a parameter which increases the probability where the classifier identifies the patch as being in the first class.

28. The system of claim 26, wherein the correction applied is a function of the probability that a pixel is in a redeye modified by a parameter which decreases the probability where the classifier identifies the patch as being in the second class.

29. The system of claim 25, wherein the classifier module assigns patches to one of the first class, the second class and a third class of patches comprising patches wherein both of the first and the second classifiers are uncertain as to whether the patch includes a redeye.

30. The system of claim 22, wherein the detection module further comprises a component which assigns a circularity probability to each of a plurality of the pixels and wherein the probability that a pixel is within a red eye is a function of the assigned circularity probability.

* * * * *